US008683900B2

(12) United States Patent
Hurt et al.

(10) Patent No.: US 8,683,900 B2
(45) Date of Patent: Apr. 1, 2014

(54) TORCH GUIDE DEVICE

(76) Inventors: Netta Jewell Hurt, Eustace, TX (US); Mitchell Loyd Hurt, Eustace, TX (US)

(*) Notice: Subject to any disclaimer, the term of this patent is extended or adjusted under 35 U.S.C. 154(b) by 947 days.

(21) Appl. No.: 12/639,860

(22) Filed: Dec. 16, 2009

(65) Prior Publication Data
US 2010/0147122 A1 Jun. 17, 2010

Related U.S. Application Data

(60) Provisional application No. 61/201,828, filed on Dec. 16, 2008.

(51) Int. Cl.
*B26D 1/00* (2006.01)
*B26D 3/00* (2006.01)
*B23K 7/00* (2006.01)
*B23K 7/10* (2006.01)

(52) U.S. Cl.
USPC ................ 83/34; 83/613; 266/48; 266/77

(58) Field of Classification Search
USPC .................. 83/34, 613; 266/48, 77
See application file for complete search history.

(56) References Cited

U.S. PATENT DOCUMENTS

| 2,356,811 A | 8/1944 | Bellrose |
| 3,357,690 A | 12/1967 | Firestone |
| 3,701,515 A | 10/1972 | Field |
| 3,713,637 A | 1/1973 | Cable et al. |
| 3,785,631 A | 1/1974 | Prye |
| 3,819,163 A | 6/1974 | Stunkard |
| 4,053,145 A | 10/1977 | Steele |
| 4,081,179 A | 3/1978 | Frame |
| 4,256,288 A | 3/1981 | Rojas |
| 4,273,313 A | 6/1981 | DeNardo |
| 4,303,054 A | 12/1981 | Lore |
| 4,355,786 A | 10/1982 | Hamilton, Jr. et al. |

(Continued)

FOREIGN PATENT DOCUMENTS

| AU | 082724-1987 A | 6/1988 |
| EP | 0116798 A1 | 8/1984 |

(Continued)

OTHER PUBLICATIONS

Flange Wizard Tools, Magnetic Torch Guide web page; www.flangewizard.com/magnetic_torch_guide.html; Jul. 14, 2009.

(Continued)

*Primary Examiner* — Keith Walker
*Assistant Examiner* — Alexander Polyansky
(74) *Attorney, Agent, or Firm* — Carr LLP

(57) ABSTRACT

A torch guide device for cutting target material is presented, the torch guide device including a torch cradle assembly coupled to a rail assembly. The torch cradle assembly is configured for holding a torch to align a torch tip of the torch to the target material. The torch cradle assembly is movable along the rail assembly for cutting the target material along a cutting path. The connector member couples the torch cradle assembly to the rail assembly. The connector member comprises a pivot for pivoting the torch cradle assembly relative to the rail assembly. The torch cradle assembly, in a first position, pivots about the pivot to engage at least a portion of the rail assembly to establish an orientation of the torch tip relative to the target material.

9 Claims, 10 Drawing Sheets

(56) References Cited

U.S. PATENT DOCUMENTS

| | | |
|---|---|---|
| 4,363,469 A | 12/1982 | Cruzan, II |
| 4,389,039 A | 6/1983 | Domres |
| 4,391,433 A | 7/1983 | Doan |
| 4,411,411 A | 10/1983 | Barthelmess |
| 4,549,725 A | 10/1985 | Carroll |
| 5,110,095 A | 5/1992 | Dougal |
| 5,256,212 A | 10/1993 | Magnuson |
| 5,265,849 A | 11/1993 | Yamashita |
| 6,086,481 A | 7/2000 | Li |
| 6,620,373 B2 | 9/2003 | DeCamp |
| 6,641,029 B2 | 11/2003 | Bonnell |
| 6,696,012 B1 | 2/2004 | Theriot |
| 6,764,640 B1 * | 7/2004 | Talkington et al. ............. 266/77 |
| 7,066,627 B1 | 6/2006 | Chen |

FOREIGN PATENT DOCUMENTS

| | | |
|---|---|---|
| GB | 1156684 | 7/1969 |
| GB | 2261146 A | 5/1993 |
| JP | 2005-14016 | 1/2005 |
| WO | WO 88/03456 A1 | 5/1988 |
| WO | WO 01/76807 A1 | 10/2001 |

OTHER PUBLICATIONS

Direct Industry; Portable CNC Cutting Machine web page; http://www.directindustry.com/prod/ae2pi/portable-cnc-cutting-machine-for-plasma-and-oxy-fuel-cutting-heads-61102-390503.html.

Dalian Huarui Heavy Industry CNC Equipment Co., Ltd.; CNC Cutting Machine; http://www.honeybeecnc.com/en/cpShow.asp?id=85.

HaftaHavit Tool; photographs; HaftaHavit Tool LLC, Platte City, MO 64079; Apr. 13, 2012.

Tanjant Tool; Trakka Line Cutter TJ5085E; Tanjant Tool Company Pty Ltd.; Mar. 13, 2013.

* cited by examiner

TORCH GUIDE DEVICE

CROSS-REFERENCE TO RELATED APPLICATIONS

This application relates to, and claims the benefit of the filing date of, U.S. provisional patent application Ser. No. 61/201,828 entitled PLASMA TORCH HOLDER, CUTTING GUIDE TOOL, filed Dec. 16, 2008, the entire contents of which are incorporated herein by reference for all purposes.

BACKGROUND

1. Field of the Invention

The present invention relates to hand-held torches and, more particularly, to devices for guiding a hand-held torch along a cutting path.

2. Description of the Related Art

It is known that to guide a hand-held torch device, such as a plasma torch, along a cutting material a tip of the torch where the hot gases are ejected must be kept at a set height and at a set angle from the cutting material. Some torch users manually guide a torch along a cutting path by hand, relying on their own steadiness. Known devices for guiding plasma torches or other cutting tools along a cutting path on cutting material include attachments affixed onto the tip of the torch such as in U.S. Pat. No. 6,620,373 to DeCamp. Known devices also include support structures that guide the torch along a rail, such as in U.S. Pat. No. 4,363,469 to Cruzan. In each of these devices, once the torch tip is disengaged from the cutting material, the user must reset the relative position and orientation of the torch tip to the cutting material to return to the same cut or cut a second cutting material in the same way as the first.

SUMMARY

A torch guide device for cutting target material is presented, the torch guide device including a pivotable torch cradle assembly coupled to a rail assembly. The torch guide assembly engages at least a portion of a rail assembly to establish a first orientation of a torch tip relative to a target material for cutting the target material.

BRIEF DESCRIPTION OF DRAWINGS

For a more complete understanding of the present invention, and the advantages thereof, references is now made to the following descriptions taken in conjunction with the accompanying drawings, in which.

DETAILED DESCRIPTION

Figure 1:
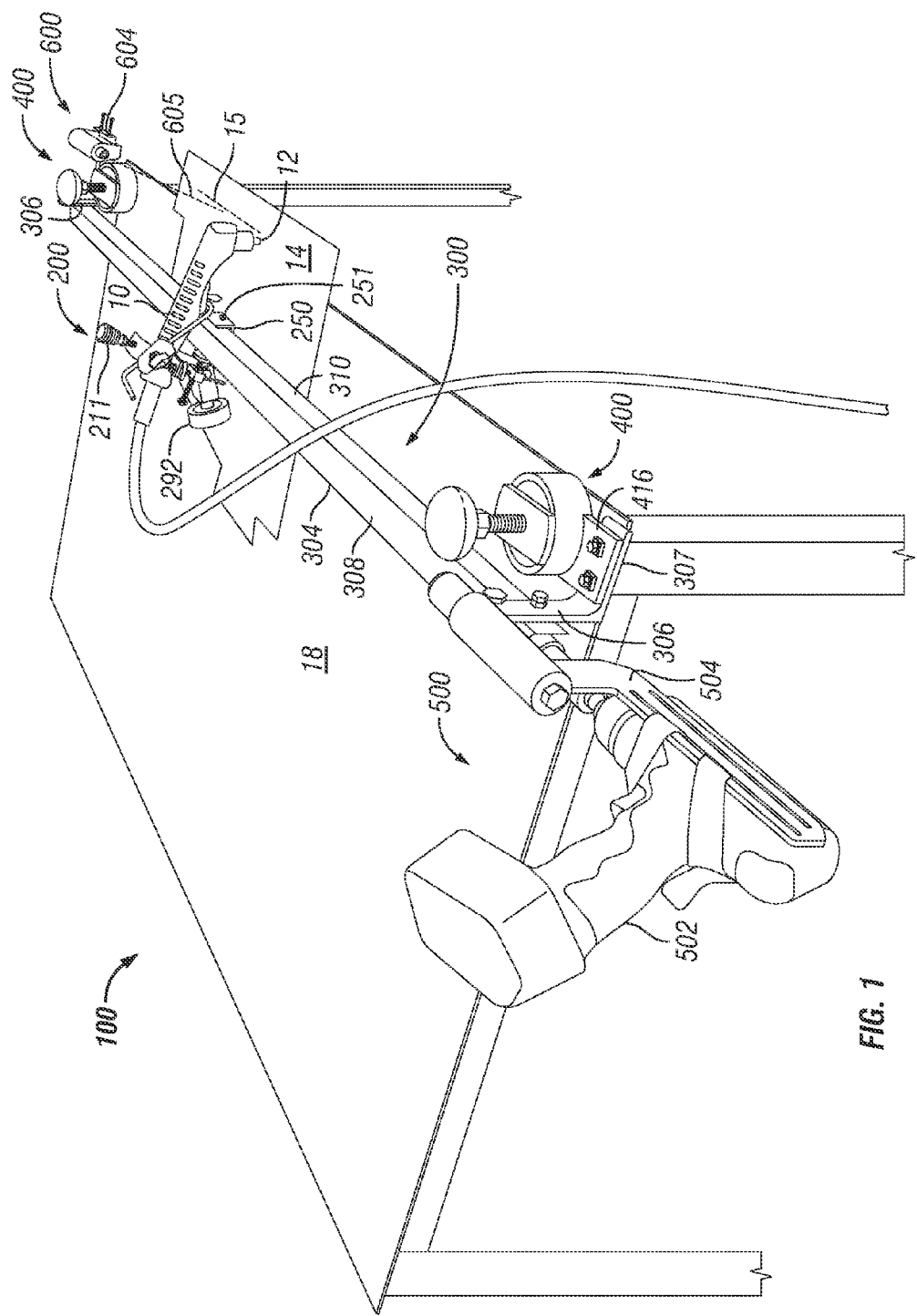
FIG. 1 is a cutting device for guiding a torch along a cutting path.

Referring now to FIG. 1, there is shown a perspective view of a cutting device 100 for guiding a torch 10, such as a plasma torch, along a cutting path 15. The cutting device 100 may comprise a torch guide assembly 200 movably mounted or coupled on a rail assembly 300. The torch guide assembly 200 may be configured to hold and orient the torch 10 so that a torch tip 12 of the torch 10 is placed proximal to a material 14 for cutting the material 14. The torch guide assembly 200 may include one or more adjustment features which set one or more parameters fixing an orientation of the torch tip 12 relative to the material 14, such as torch tip height and torch tip angle relative to the cutting material 14. In some embodiments, the rail assembly 300 may guide the torch guide assembly 200 along a cutting path 15 on the material 14.

Figure 2:
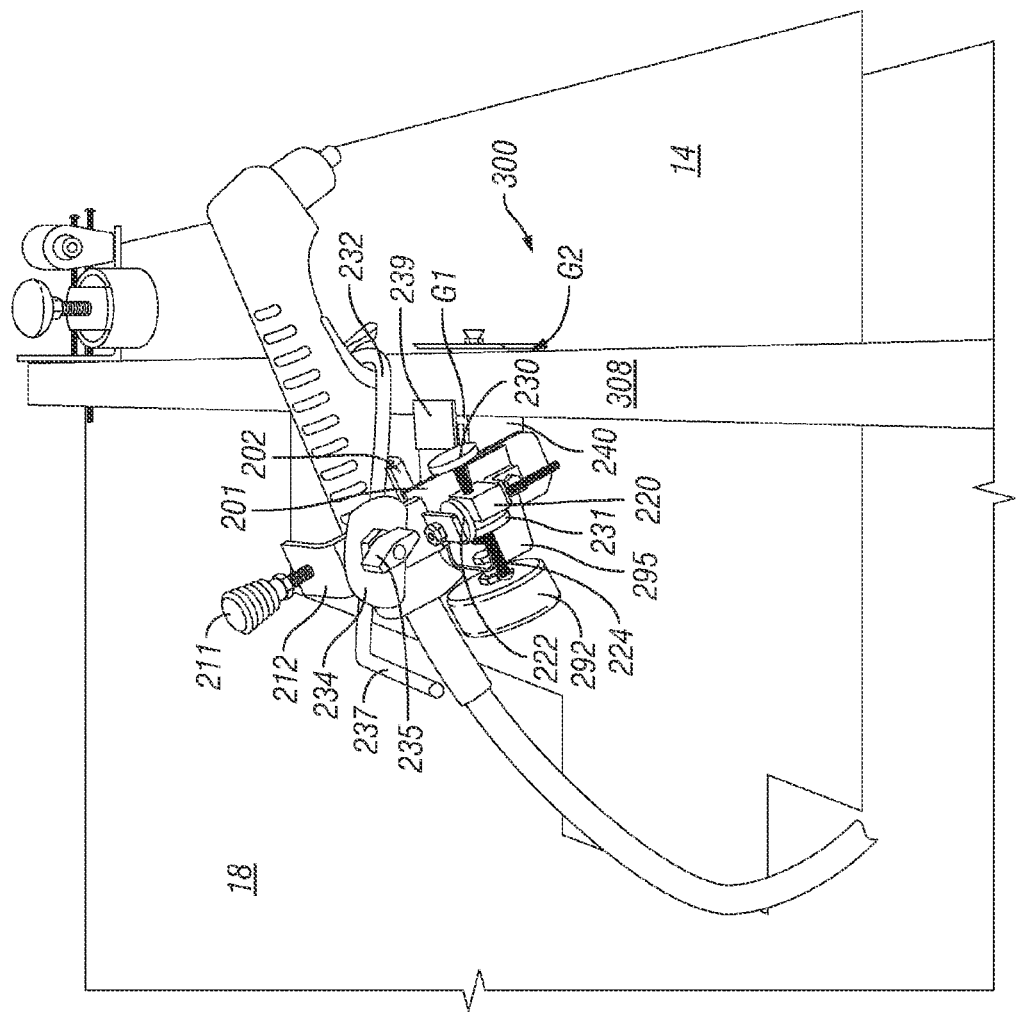
FIG. 2 is a perspective view of a torch guide assembly disengaged from a cutting material.
Figure 3:
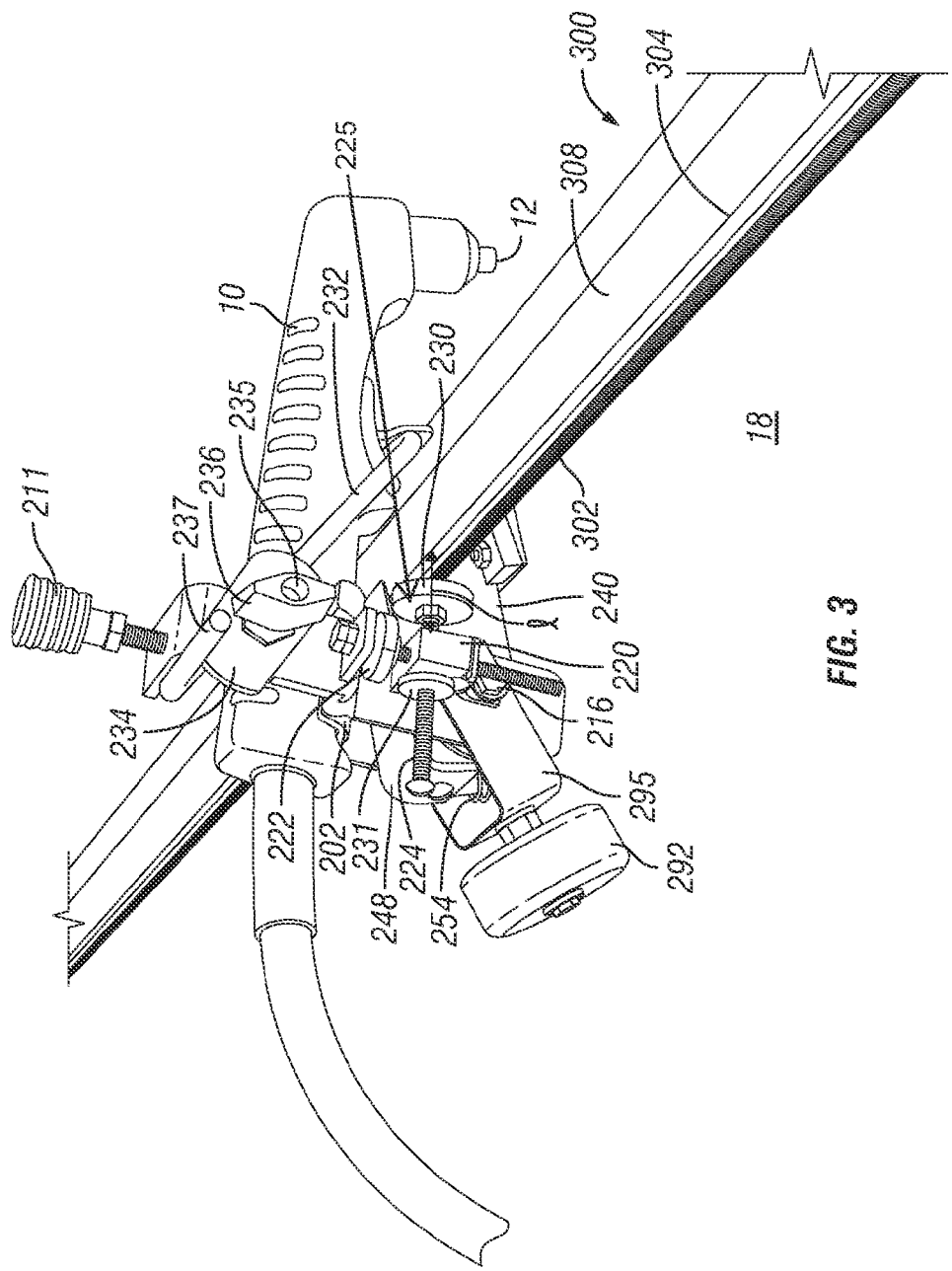
FIG. 3 is a perspective view of a torch guide assembly in an engaged position with cutting material.

Referring now to FIG. 2, there is shown a perspective view of the torch guide assembly 200 disengaged from the cutting material 14. FIG. 3 shows a perspective view of the torch guide assembly 200 in an engaged position, where at least a portion of the torch guide assembly 200 engages a portion of the rail assembly 300, such as a rail 304. The torch guide assembly 200 may include a disengagement mechanism which allows the torch 10 to be moved away from an engaged position (shown in FIG. 1) with the material 14 and to be returned to the engaged position without requiring the adjustment features to be recalibrated. In some embodiments, the disengagement mechanism may comprise a cradle assembly 201, which may include a cradle support 202, shown in FIG. 4, for supporting the torch 10, pivotally mounted on a connector member 240, shown in FIG. 2. The connector member 240 may couple the torch guide assembly 200 to the rail assembly 300.

Referring back to FIG. 1, the cutting device 100 may further comprise one or more clamp assemblies 400 for holding the cutting device 100 firmly to a table top surface 18. In some embodiments, the clamp assemblies 400 may comprise magnets, which may include a magnetic force release mechanism for releasing the clamp from the table top 18 that is made from metal.

The torch guide assembly 200 may be moved along the rail assembly 300 by a force imparted by the motor assembly 500 coupled the rail assembly 300. The motor assembly 500 may comprise a hand-held drill 502, commonly available to the consumer, mounted on a motor support bracket 504. The drill 502 may rotate a threaded shaft 302 on the rail assembly 300 to transfer the rotational movement of a drive mechanism of the drill 502 into linear movement of the torch guide assembly 200.

A laser guide assembly 600 may also be mounted to the rail assembly 300 for shining a light substantially along the cutting path 15. The laser guide assembly 600 may comprise a laser light 602, which may be oriented so that the light demarcates a straight line cutting path 15 along a surface of the cutting material 14. A user of the cutting device 100 may align the torch tip 12 to the cutting path 15 to ensure that the correction portion of the material 14 is being cut.

Figure 4:
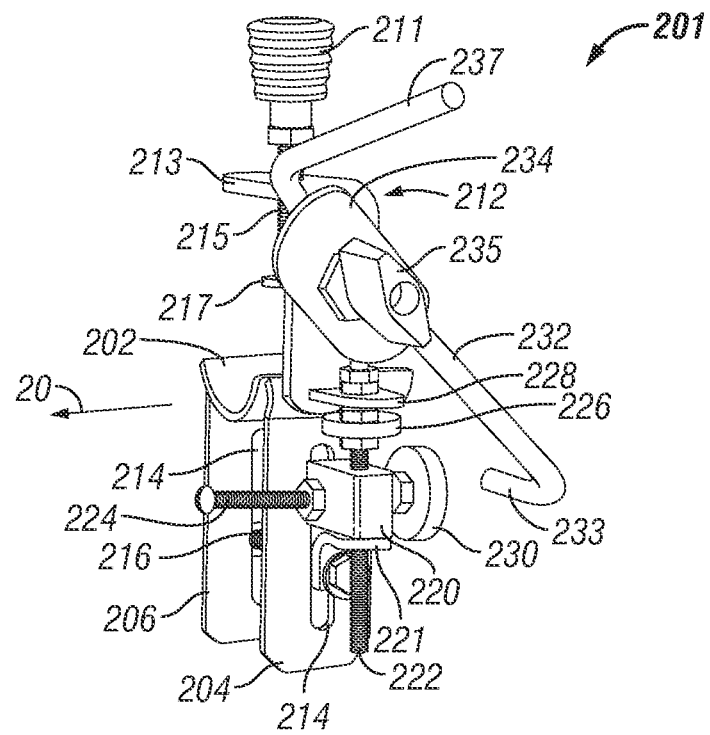
FIG. 4 is a perspective view of a torch guide assembly for holding and supporting a torch in movement along a rail assembly.

Referring now to FIG. 4, there is shown a first perspective view of the torch guide cradle assembly 201 for holding and supporting the torch 10 (shown in FIG. 1) in movement along the rail assembly 300 (shown in FIG. 1). The torch 10 may be supported by the cradle assembly 201 for aligning the torch tip 12 to the material 14 (shown in FIG. 1). A holding clamp 212 may hold the torch 10 in place on a cradle support 202 relative to the cradle assembly 201.

Figure 5:
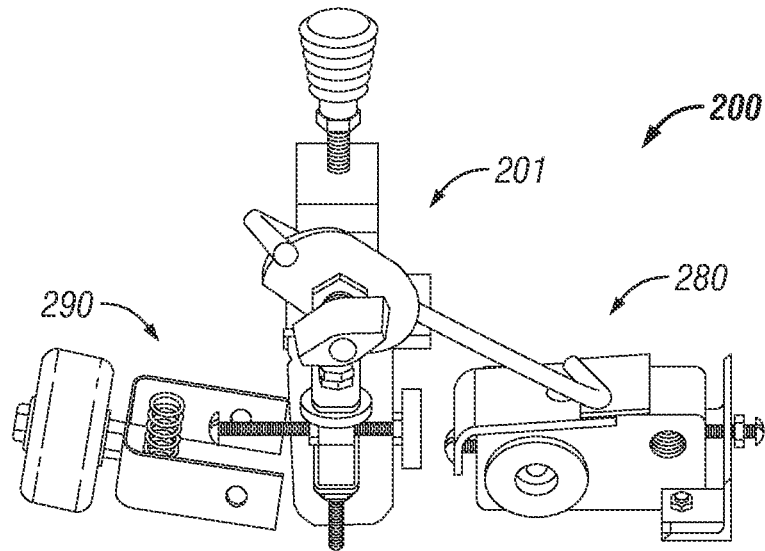
FIG. 5 is an exploded view of a torch guide assembly.

Referring now to FIG. 5, there is shown an exploded view of the torch guide assembly 200. The torch guide assembly 200 may include the cradle assembly 201, as described above, a connector assembly 280 for coupling the rail assembly 300 (shown in FIGS. 1 and 2) to the cradle assembly 201, and a roller assembly 290 for supporting the cradle assembly 201.

Referring again to FIG. 4, the cradle support 202 may comprise a contoured surface, having a cup or saddle shape, for receiving a bottom portion of the torch 10. The contoured surface may be shaped to guide the torch 10 into a cutting position so that the torch 10 extends from the torch guide assembly 200 in a first direction 20.

A clamp arm 213 of the holding clamp 212 may extend away from and above the cradle support 202 and may have a portion hanging over the cradle support 202. A first threaded member 215 may extend through the overhanging portion. The threaded member may comprise a knob member 211 at one end and a clamp member 217 at another end. The clamp member 217 may comprise substantially flat surfaces for making contact with outer portions of the torch 10 and holding the torch 10 against the contoured surface of the cradle support 202.

An actuation member 232 may be coupled to the clamp arm 213 for keeping the torch 10 (not shown) in an "on" configuration while the torch 10 is being guiding along the rail assembly 300. The actuation member 232 may be coupled to the clamp arm 213 by a housing 234 that is threadably attached to the clamp arm 213. The actuation member 232 may extend from the torch guide assembly 200 to actuate a trigger on the torch.

A threaded member 235, such as a screw or bolt, may extend through the housing 234 to attach the housing 234 to the clamp arm 213. The threaded member 235 may include a head member 236, such as a knob, for rotating the threaded member 235 into the housing 234. The housing 234 may comprise a concave shape to create a channel for the actuation member 232 to pass between inner surfaces of the housing 234 and an outer portion of the clamp arm, as shown in FIG. 11B. The housing 234 may press at least a portion of the actuation member 232 to hold the actuation member 232 in place when the head member 236 of the threaded member 235 may be screwed tight to bring the housing 234 closer to the clamp arm 213.

Referring to FIG. 4, the actuation member 232 may comprise a rod having at least two bent portions. The first bent portion 233 may extend at an angle from a straight portion 235. The second bent portion 237 may also extend from the straight portion 235 at an angle at an end opposite from the first bent portion 233. The angles between the straight portion 235 and the first bent portion 233 may be configured so that the first bent portion 233 may be positioned to actuate a torch trigger of the torch 10 and locked in place relative to the torch 10 and the cradle support 202 to maintain the torch 10 in the on position during movement of the torch 10 along the rail assembly 300.

Referring to FIG. 4, a first arm 204 and a second arm 206 may extend away from and below the cradle support 202 on an opposite side of the cradle support 202 from the holding clamp 212. Each of the first arm 204 and the second arm 206 may extend parallel to one another and each may define a slot 214 also extending in a direction away from the holding clamp 212.

In some embodiments, the connector member 240 may comprise a pivot for pivoting at least a portion of the torch guide assembly 200 relative to the rail assembly 300. In some embodiments the pivot may comprise a bolt 216 that at least pivotally couples the connector member 240 to the cradle assembly 201, as shown in FIG. 11B.

Referring now to FIG. 4, the slots 214 of the first arm 204 and the second arm 206 may be configured to receive the first bolt 216. The first bolt 216 may ride within the slot 214 so that it is slideable within the slots 214 for adjusting the height of the connector member 240 relative to the torch guide assembly 200. The first bolt 216 may further comprise a pivot knob 218 (shown in FIG. 11B) for tightening a head portion of the first bolt 216 and fixing a position of the first bolt 216 along a length of the slots 214. In some embodiments, the pivot knob 218 is manufactured from plastic, but it will be understood by persons of ordinary skill in the art that other suitable materials, such as metal, wood, rubber, or other composites may be utilized.

The first bolt 216 may be configured to couple to an extension block 220 at an extension block arm 221, which may receive the first bolt 216 in a bore defined in the extension block arm 221. The extension block 220 may be configured to threadably receive a first threaded member 222 and a second threaded member 224 in threaded apertures that are defined as extending through the extension block 220 at angles generally perpendicular to each other.

The first threaded member 222 may extend through the extension block 220 in a direction parallel to the first arm 204 and the second arm 206 and parallel to the direction that the first bolt 216 may slide within the slots 214. The first threaded member 222 may comprise a first head portion 226 at one end of the first threaded member 222. The first head portion 226 may comprise a cylindrical or disc member coupled by nuts to the first threaded member 222 and configured for turning the first threaded member 222 to advance the first threaded member 222 through the extension block 220.

The first head portion 226 may be positioned to extend from the extension block 220 to abut or make contact with a tab portion 228, which extends from the holding clamp 212 in generally a perpendicular direction to the first arm 204 and the second arm 206. The threaded member 222 may be rotated manually so that the first head portion 226 makes contact with the tab portion 228.

The second threaded member 224 may extend through a threaded bore 227 in the extension block 220 in a direction that is generally perpendicular to the direction that the first threaded member 222 extends and generally parallel to the first direction 20. The second threaded member 224 may be coupled to at least a portion of the torch guide assembly 200 at distance offset from first bolt 216—the point at which the cradle assembly 201 of the torch guide assembly 200 pivots. The second threaded member 224 may comprise a second head portion 230 positioned at one end and comprising a cylindrical or disc member coupled by one or more nuts to a shaft portion of the second threaded member 224. The second head portion 230 may include a surface for abutting or making contact with a portion of the rail assembly 300, as shown in FIG. 3.

As shown in FIG. 3, the length l of the second threaded member 224 may comprise a first adjustable stop 225 that establishes a distance between the portion where the second threaded member 224 couples and the second head portion 230.

When the second head portion 230 of the second threaded member 224 engages to make contact with the rail 304 of the rail assembly 300 it may provide a reference distance and tilt that the cradle assembly 201 maintains throughout its travel along the rail assembly 300. The second head portion 230 may be rotated by the user to adjust the length l. By adjusting the length l, the torch guide assembly 200 is tilted about the first bolt 216 which changes the orientation of the torch guide assembly 200 relative to the rail assembly 300 and the orientation of the torch tip 12 relative to the material 14. In some embodiments, the length l of the first adjustable stop 225 may be adjusted to set the tilt and distance of the cradle support 202, and thus the torch 10, relative to the rail assembly 300 and the cutting material 14.

In some embodiments, such as the one shown in FIG. 2, a locking device 231 may be positioned on the second threaded member 224 on the opposite side of the extension block 220 from the second head portion 230. The locking device 231 may comprise a disc member having a central bore and configured to threadably engage a shaft portion of the second threaded member 224. The locking device 231 may be manually screwed onto the second threaded member 224 until the locking device 231 is tightened against the extension block for holding the length l; establishing a distance and a tilt of the cradle assembly 201 relative to the rail assembly 300.

Rail Assembly 300

Turning now to FIGS. 1 and 3, the rail assembly 300 may comprise a threaded rod 302 and the first rail 304 mounted on stands 306 so that the threaded rod 302 and the first rail 304 extend substantially in parallel at a height along the stands 306. The stands 306 may be configured to position the threaded rod 302 and the first rail 304 so that the threaded rod 302 and the first rail 304 lie parallel to a table surface 18 for even cutting of the material 14 with the torch 10. The rail assembly 300 may be fixed relative to the table surface 18 by one or more table clamp assemblies 400.

The threaded rod 302 may be mounted on the stands 306 so that the threaded rod 302 is slightly below at least a portion of the first rail 304 in a direction towards the table surface 18, generally a downward direction. The first rail 304 may comprise a first guide strip 308 and a second guide strip 310 extending perpendicularly to form an L-shaped beam. The first guide strip 308 may comprise a rigid elongated strip extending in parallel to the threaded rod 302 and positioned substantially over the threaded rod 302.

The second guide strip 310 may be coupled to the first guide strip 308 so that the first guide strip 308 and the second guide strip 310 form an L-shaped profile. In some embodiments, the first guide strip 308 and the second guide strip 310 may be formed from as one integral piece of material without fasteners. The second guide strip 310 may extend in parallel to the threaded rod 302 and on a first side of the threaded rod 302.

The first guide strip 308 and the second guide strip 310 provide a support for guiding the torch guide assembly 200 along the cutting path 15, which in some embodiments comprises a substantially straight path.

Connector Member 240

Figure 6:
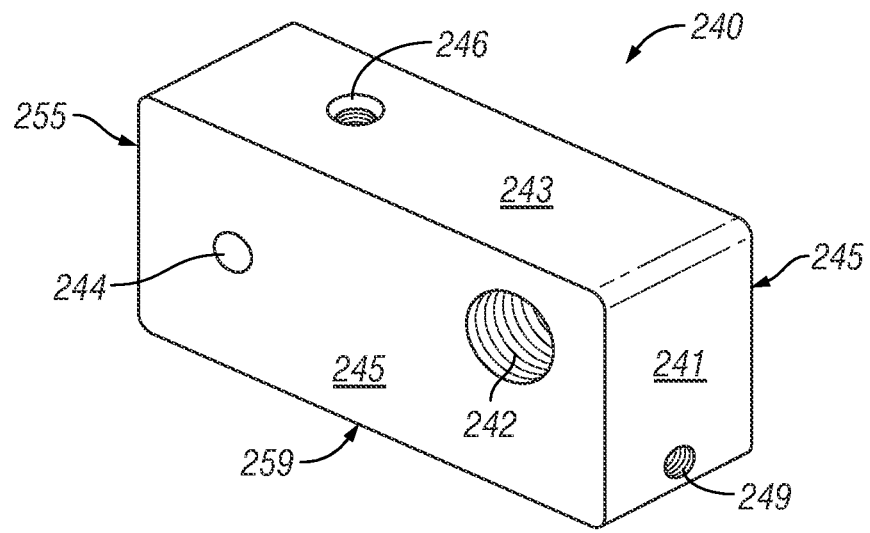
FIG. 6 is a perspective view of a connector member for coupling a torch guide assembly to a rail assembly.

Turning now to FIG. 6, there is shown a perspective view of a connector member 240 for coupling the torch guide assembly 200 to the rail assembly 300. Generally, the connector member 240 may comprise a rectangular block having a front face 241, a top face 243 and side faces 245, which are on either sides of the front face 241 and top face 243.

The connector member 240 may define a first bore 242 passing through the connector member 240, which may be threaded for receiving the threaded rod 302 (not shown) of the rail assembly 300. The first bore 242 may extend from one side 245 of the connector member 240 to an opposite side 245 so that the first bore 242 extends generally parallel to the front face 241 and the top face 243. The first bore 242 may be positioned on the sides 245 of the connector member 240 generally towards and proximal to the front face 241.

The connector member 240 may define a second bore 244 for receiving the first bolt 216 (not shown). The second bore 244 may extend through the connector member 240 from the sides 245 in a direction parallel to the first bore 242. The second bore 244 may be positioned on the sides 245 generally away from the first bore 242 and towards an opposite face from the front face 241 of the connector member 240.

The connector member 240 may be further configured to couple to and move along portions of the rail assembly 300. As shown in FIG. 6, the connector member 240 may comprise a third bore 246 and a fourth bore 247 knot shown) on back face 255, each of which may be threaded to receive a threaded member, such as a screw a bolt, or other fastener. The third bore 246 may be positioned along the top face 243 proximal to a back face 255.

Figure 7:
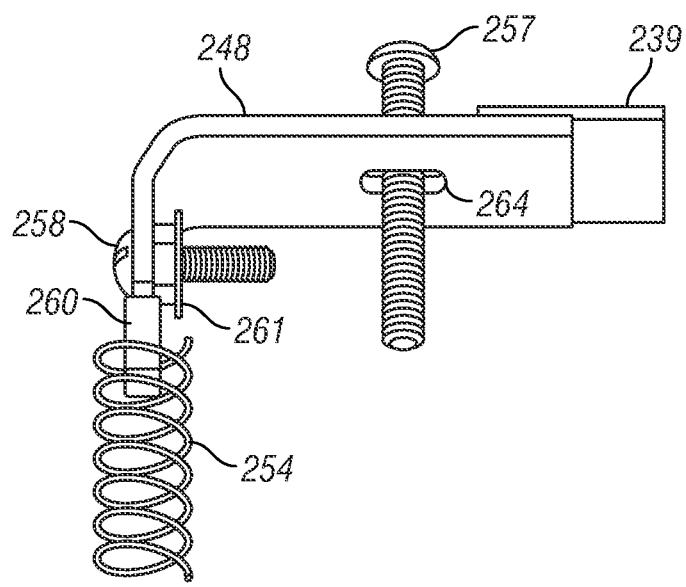
FIG. 7 is a perspective view of a first guide plate.
Figure 9:
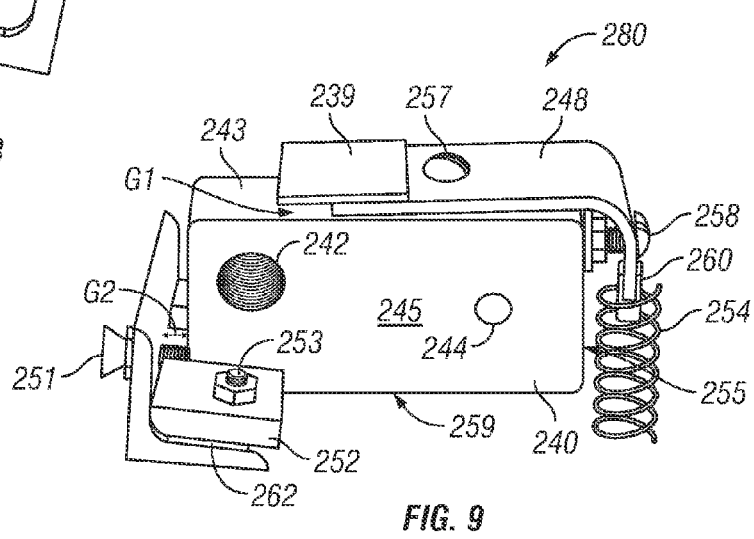
FIG. 9 is a perspective view of the connector assembly with a first guide plate and a second guide plate coupled to a connector member.

Turning now to FIG. 7 shows a perspective view of a first guide plate 248, and FIG. 9 shows a perspective view of the connector assembly 280 with the first guide plate 248 coupled to the connector member 240. The first guide plate 248 may be coupled to the connector member 240 by bolts 257, 258 which may pass through bores in the first guide plate 248 to threadably couple the first guide plate 248 at the third bore 246 (shown in FIG. 6) and the fourth bore 247 (not shown) positioned to extend through the back face 255.

The first guide plate 248 may comprise a L-shaped member with a first arm extending along a surface of the top face 243 to be coupled to the connector member 240 at the third bore 246 (shown in FIG. 6) with a third bore bolt 257. The third bore bolt 257 may pass through an elongated bore 264 in the first arm of the first guide plate 248 to reach the third bore 246. The elongated bore 264 may allow the first guide plate 248 to translate relative to the connector member 240 for fitting and adjusting the torch guide assembly 200 (not shown) to the rail assembly 300 (not shown).

A second arm of the first guide plate 248 may extend along a surface of the back face 255 to couple to the connector member 240 at the fourth bore 247 with a fourth bore bolt 258. A nut and washer positioned on the fourth bore bolt 258 between the second arm of the first guide plate 248 and the surface of the connector member 240 where the fourth bore bolt 258 enters the fourth bore 247. The nut and washer may secure the fourth bore bolt 258 to the first guide plate 248. The washer 261 may further operate as a shim for fitting and adjusting the connector member 240 (not shown) to the rail assembly 300 (not shown). It should be understood that different size washers may be used for variations in adjustment of the connector member 240 to the rail assembly 300.

An extension member 239, comprising a generally flat rectangular plate, may be coupled on top of one side of the first arm so that the extension member 239 extends from the first arm. The extension member 239 may be attached to the second arm of the first guide plate 248 by means of welding, a screw, adhesive or other form of attachment known by persons of ordinary skill in the art.

Figure 8:
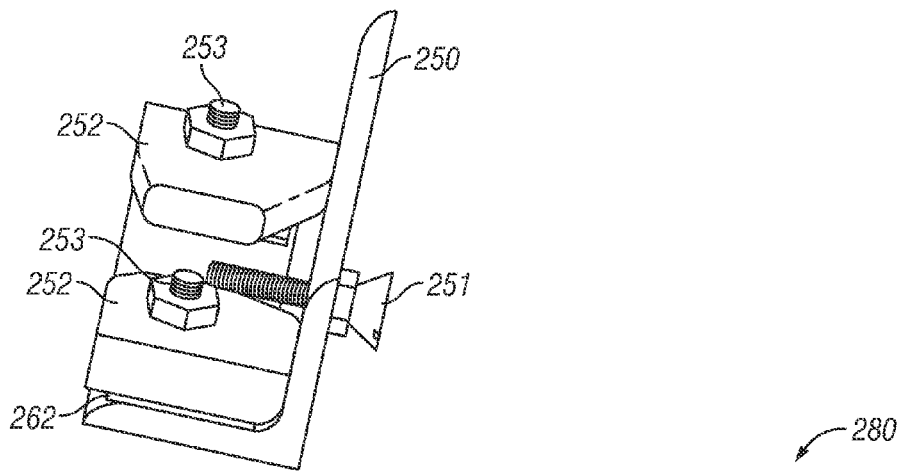
FIG. 8 is a perspective view of a second guide plate.

Turning to FIG. 8, it shows a perspective view of a second guide plate 250, and FIG. 9 shows the connector member 240 coupled to the second guide plate 250. The connector member 240 may further comprise a fifth bore 249 (shown in FIG. 6) extending into the front face 241, which may be threaded to receive a bolt, screw or other threaded member.

The second guide plate 250 may be coupled to the connector member 240 by a threaded member, such as a screw 251, which may pass through a bore in the second guide plate 250 to threadably couple the second guide plate 250 at the fifth bore 249. The second guide plate 250 may comprise an L-shaped member with one arm configured to extend along a bottom face 259 of the connector member 240, and another arm extending along the front face 241 to couple to the connector member 240 at the fifth bore 249.

The second guide plate 250 may further comprise guide pads 252, which may be positioned on inner surfaces of the L-shaped second guide plate 250, so that each guide pad 252 abuts each side 245 to flank the front face 241 of the connector member 240. In some embodiments, the guide pads 252 are made from metal, carbon, steel, or other suitable material readily known by persons of ordinary skill in the art. The guide pads 252 may be coupled to the second guide plate 250 by bolts 253 secured with nuts, which engage bores in the arm of the second guide plate 250 that extends along the bottom face 259 of the connector member 240. Between the guide pads 252 and the second guide plate 253, shims 262 may be positioned to elevate the guide pads 252.

As shown in FIG. 3, the connector member 240 may be coupled to the rail assembly 300 for movement of the connector member 240 on the threaded rod 302 and along the first rail 304. The threaded rod 302 may be threadably coupled to the connector member 240 at the first bore 242.

Turning to FIG. 2, at least a portion of the first guide strip 308 may be positioned to insert into a first gap G1 (shown in FIG. 7) formed between the extension member 239 and the top face 243 (referenced in FIG. 9). The third bore bolt 257 may be adjusted to provide space for the first guide strip 308 to move within the first gap G1 without substantial friction between the first guide strip 308 and the surfaces of the extension member 239 and the top face 243.

As shown in FIGS. 1 and 2, at least a portion of the second guide strip 310 may be positioned to insert into a second gap G2 (shown in FIGS. 2 and 9) formed between the front face 241 and the second guide plate 250. The screw 251 may be adjusted to provide space for the second guide strip 310 to move within the second gap G2 without substantial friction between the second guide strip 310 and the surfaces of the front face 241 and the second guide strip 250. Furthermore, the shims 262 (shown in FIGS. 8 and 9) may be used to elevate the guide pads and remove slack between the second guide plate 250 and the second guide strip 310.

As shown in FIGS. 2 and 3, the cradle assembly 201 may be pivotally coupled to the connector member 240 for pivoting the cradle support 202 and torch 10 from at least a first position to a second position. In some embodiments, the first position comprises a cutting position where the torch tip 12 of the torch 10 is placed proximal to the cutting material 14. In this first position, the torch tip 12 is engaged with the cutting material 14 for cutting the material by movement of the torch tip 12 along the surface of the material 14. The second position, shown in FIG. 3, may comprise a disengaged position, which in some embodiments allows movement or replacement of the cutting material 14 without having the torch 10 obstruct or disrupt such movement or replacement.

Roller Assembly 290

Figure 10:
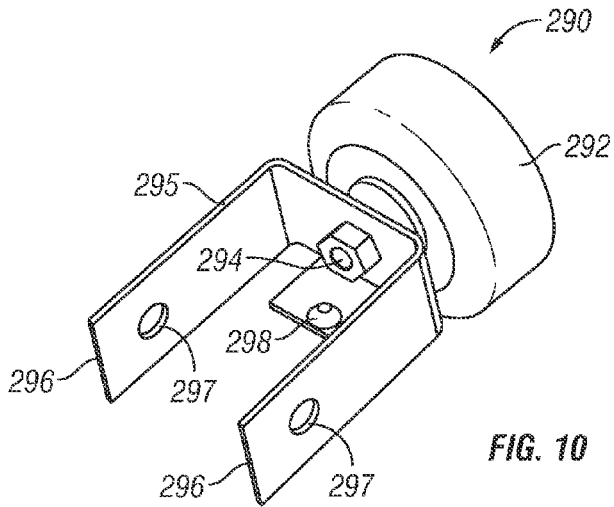
FIG. 10 is a perspective view of a roller assembly.

Turning now to FIG. 10, there is shown an illustration of a roller assembly 290. The roller assembly 290 may comprise a roller member 292, such as a rubber wheel, mounted on an axle 294 extending from a wheel bracket 295 having roller arms 296 extending away from the roller member 292. A nut may secure the axle 294 and roller member 292 to a body portion of the wheel bracket 295. The roller arms 296 may define roller arm bores 297 configured for receiving the first bolt 216 to attach the roller assembly 290.

As shown in FIG. 1, the roller member 292 may be mounted to the torch guide assembly 200 to make contact with the table top 18.

Figure 11A:
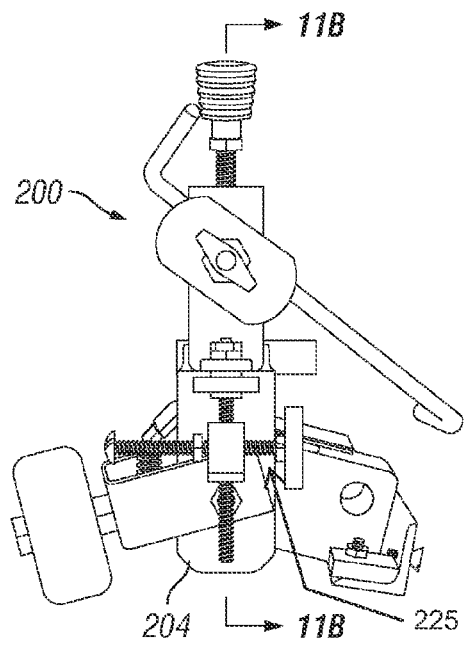
FIGS. 11A and 11B show a side view of an assembled torch guide assembly and a cross-sectional view of the torch guide assembly taken along line 11B-11B shown in FIG. 11A, respectively.
Figure 11B:
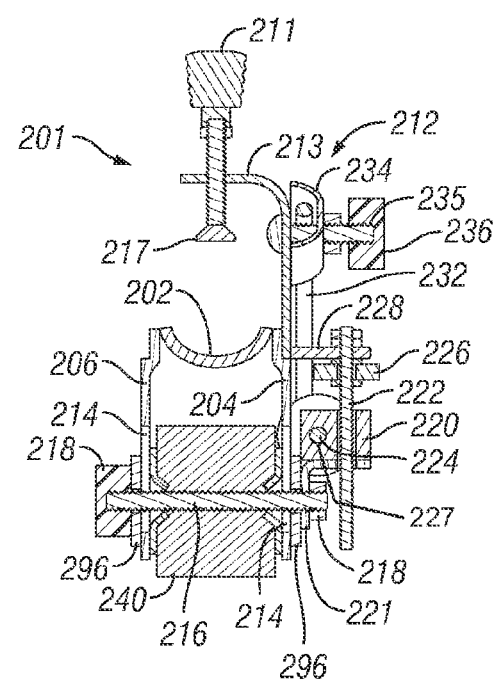

Turning now to FIGS. 11A and 11B, there is shown a side view of the assembled torch guide assembly 200 and a cross-sectional view of the torch guide assembly 200 taken along line 11B-11B. The first bolt 216 may couple the first arm 204 and the second arm 206 of the cradle assembly 201 to the connector member 240. The first bolt 216 may comprise a length for extending through the extension block arm 221, the roller arms 296, the connector member 240, and the slots 214 of the first arm 204 and the second arm 206. The roller assembly 290, the cradle assembly 201, and the extension block 220 are held fixed together between a head portion 217 at one end of the first bolt 216 and the pivot knob 218 at an opposite end, when the pivot knob 218 is tightened against the roller arm 296. When the pivot knob 218 is loosened the cradle assembly 201 may be free to pivot from an engaged position to a disengaged position, toward or away from the rail assembly 300 (as shown in FIGS. 2 and 3). Also, the first bolt 216 may ride along the slots 214 to position the connector member 240, the roller assembly 290 (shown in FIG. 5), and the extension block 220 relative to the cradle assembly 201, which may raise or lower the cradle assembly 201, including the torch 10 (not shown) relative to the table top 18.

As shown in FIG. 3, a spring 254 may be coupled between the connector member 240 and the roller assembly 290. The spring 254 may couple to the second arm of the first guide plate 248. In some embodiments, the first guide plate 248 may comprise one or more tabs 260 for coupling a first end of the spring 254 to the second arm. The tabs 260 may fit within one or more coils of the spring 254 to capture the first end of the spring 254. In some embodiments, the spring 254 is fastened by a press fit, welding, gluing, clamping or any other method of attachment known in the art.

A second end of the spring 254 may be coupled to a second insert member 298 located on inner portions of the wheel bracket 295. The second insert member 298 may comprise a tab, a hook, or an extension that may fit within one or more coils of a second end of the spring 254 on a side opposite from the first end, which may connect to the tabs 260.

The roller member 292 may act as a counterbalance to stabilize movement and prevent jostling of the cradle assembly 201 in movement along the rail assembly 300. The spring 254 may operate as a damper to further smooth perturbations or unwanted vibrations caused by movement of the cradle assembly 201 along the rail assembly 300. The spring 254 and wheel bracket 295 may alone or in combination provide for a smoother and straighter cut of the cutting material 14.

Clamp Assembly 400

As shown in FIG. 1, one or more clamp assemblies 400 may be mounted to the rail assembly 300 to a table top 18. In some embodiments, the clamp assembly 400 comprises a magnet that attaches by magnetic forces to the table surface, wherein the table top 18 is made from a metal or other magnetically attractive material.

Figure 12A:
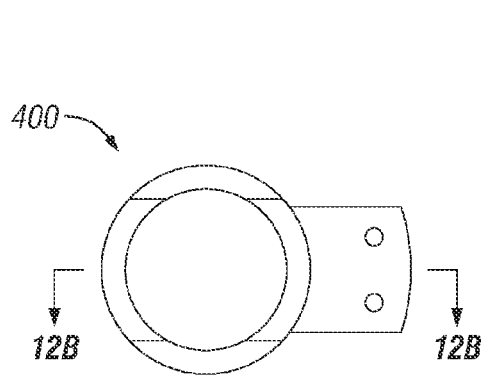
FIGS. 12A and 12B show a top view of a clamp assembly and a cross-sectional view of the clamp assembly taken from the line 12B-12B as shown in FIG. 12A, respectively.
Figure 12B:
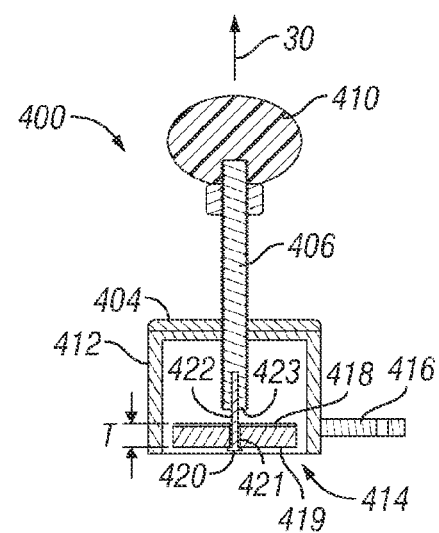
Figure 13:
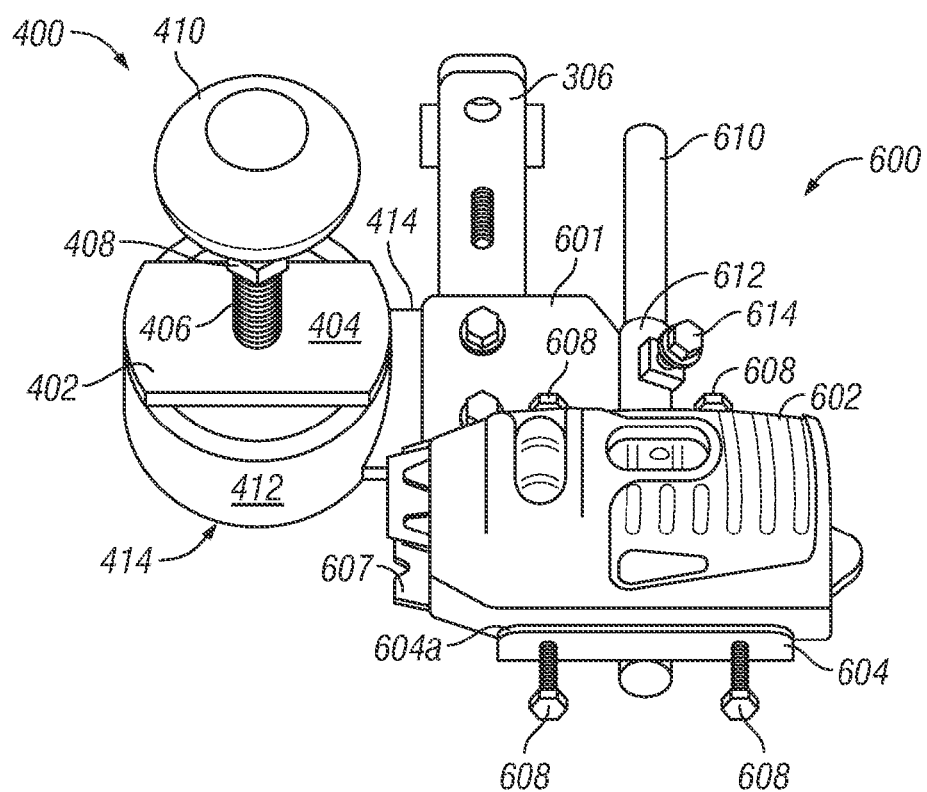
FIG. 13 shows a perspective view of a clamp assembly coupled to a laser guide assembly.

Turning now to FIGS. 12A, 12B and 13, there is shown in FIGS. 12A and 12B a top view of a clamp assembly 400 and a cross-sectional view of a the clamp assembly 400 taken from the line 12B-12B as shown in FIG. 12A. FIG. 13 illustrates a perspective view of the clamp assembly 400 coupled to the laser guide assembly 600. As shown in FIG. 13, the clamp assembly 400 comprises a clamp body comprising an outer casing 402 or shell having a generally cylindrical shape. A first shaft member comprising a first shaft portion 406 and a second shaft portion 422 may extend generally along a first longitudinal axis 30 through the shell and into a cavity defined by the outer casing 402. The first shaft portion 406 may extend towards a bottom side 414 of the outer casing 402. The second shaft portion 422 may extend from an end portion of the first shaft portion 406. The bottom side 414 may be configured to rest on the table top surface 18 (as shown in FIG. 1).

At a top surface 404 of the outer casing 402, the first shaft portion 406 may comprise a threaded member, such as a screw, a bolt, or other elongated threaded rod, that extends into a bore in the top surface 404. The first shaft portion 406 may be configured to receive a coupling member 408, such as a nut, for coupling a knob member 410 to the first shaft portion 406.

Figure 15:
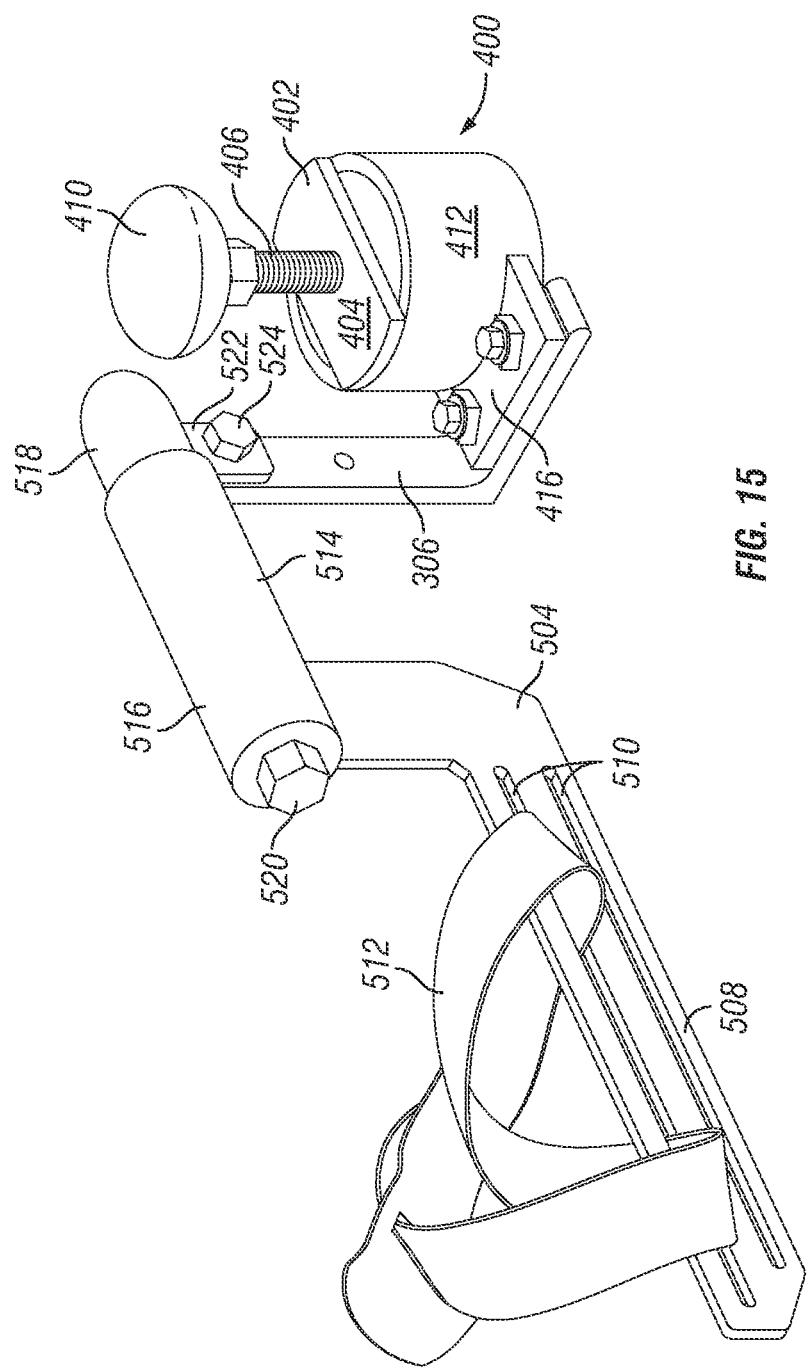
FIG. 15 shows a perspective view of a motor support bracket.

The generally cylindrical shape of the outer casing 402 may define a side surfaces 412 extending between the top surface 404 and the bottom side 414. An extension member 416 may extend from the curved surface and substantially near the bottom side 414 in a direction substantially parallel to the bottom side 414. The extension member 416 may be slightly elevated from the bottom side 414 to allow a portion of the stand 306 to fit beneath the extension member 416 for coupling the stand 306 to the clamp assembly 400 (as shown in FIG. 15)

As shown in FIG. 12B (showing a cross-sectional view of the clamp assembly 400), the clamp assembly 400 may further comprise a magnetic member 418, which may be made from a magnetic material generally shaped to sit within a cavity defined by inner surfaces of the outer casing 402. The cavity may have, in some embodiments, a generally cylindrical shape generally following the shape of the outer casing 402, though it will be understood that the shape may vary to accommodate movement of the magnetic member 418 within the cavity.

The magnetic member 418 may be sized so that it may slide within the cavity. The magnetic member 418 may be shaped in generally a flat shape, such as a flattened cylinder or a disc, having a thickness, T. A first face 419 of the magnetic member 418 may be generally oriented to point away from the top surface 404. The magnetic member 418 may be generally mounted to move along at least a portion of the second shaft portion 422.

The second shaft portion 422 may comprise generally a cylindrical member, such as a rod, machine screw or a bolt, which may pass through a magnetic member bore 421 extending into the first face 419. The magnetic member bore 421 may be have a diameter sized to allow the second shaft portion 422 to freely pass through the magnetic member bore 421, and to allow the magnetic member 418 to translate along at least a portion of the second shaft portion 422.

The second shaft portion 422 may comprise a second stop 420, which may generally comprise an enlarged portion of the second shaft portion 422 positioned at one end of the second shaft portion 422 proximal to the bottom side 414 and on an opposite side of the magnetic member 418 from the first shaft portion 406. Generally, a first dimension of the second stop 420 may be larger than the diameter of the magnetic member bore 421 in the magnetic member 418 to constrain movement of the magnetic member 418 along the shaft portion of the second shaft portion 422 and to prevent the magnetic member 418 from slipping off the first end of the second shaft portion 422.

A second end of the second shaft portion 422 may be coupled to a second end portion of the first shaft portion 406. The first shaft portion 406 may comprise a first stop 423. The first stop 423 may comprise at least the second end portion of the first shaft portion 406, where the second end portion may have generally a larger diameter than the diameter of the magnetic member bore 421 in the magnetic member 418 to constrain movement of the magnetic member 418 and to prevent the magnetic member 418 from slipping off the second end of the second threaded member 422. In some embodiments, the diameter of the first shaft portion 406 is larger than the diameter of the second shaft portion 422.

As shown in FIG. 1, to utilize the clamp assembly 400 as a clamp, the extension member 416 of the clamp assembly 400 may be coupled to a base portion 307 of the stand 306. In some embodiments, screws extending through threaded bores in each of the base portion 307 and the extension member 416 may couple the clamp assembly 400 to the rail assembly 300.

Turning back to FIGS. 12B and 12C, the second shaft portion 422 may comprise a length greater than a thickness T of the magnetic member 418 to move along the second shaft portion 422 between the first stop, the second end of the first threaded member 406, and the second stop 420 of the second threaded member 422, where the first stop 423 and the second stop 420 are positioned on opposite sides of the magnetic member 418 along the second shaft portion 422. The magnetic member 418 may be magnetically attracted to inner portions of the outer casing 402, and the magnetic member 418 may be magnetically drawn towards the top surface 404. By placing the clamp assembly 400 on a metallic table top surface 18 with the bottom side 414 resting on the top surface 18, the magnetic member 418 may be positioned between the top surface 404 and the table top surface 18, generally near the bottom side 414.

Referring to FIG. 12B, the magnetic member 418 may be moved along the second shaft portion 422 by turning the knob member 410, which may move the first shaft portion 406 and the second shaft portion 422 in the direction of a first longitudinal axis 20 to urge the magnetic member 418 within the cavity towards or away from the table top 18, depending on which direction the knob member 410 is being turned. In at least a first position the first shaft portion 406 may be rotated to insert a portion of the first shaft portion 406 into the cavity. Movement of the first shaft member 406 may urge the magnetic member 418 close enough to the table top surface 18 to snap to the table top surface 18, which may create a magnetic coupling between the clamp assembly 400 and the table top 18 strong enough to support and keep the rail assembly 300 fixed in place throughout operation of the cutting device 100. The magnetic member 418 may make contact with the second stop 420, which may prevent the magnetic member 418 from dismounting from the second shaft portion 422.

Figure 12C:
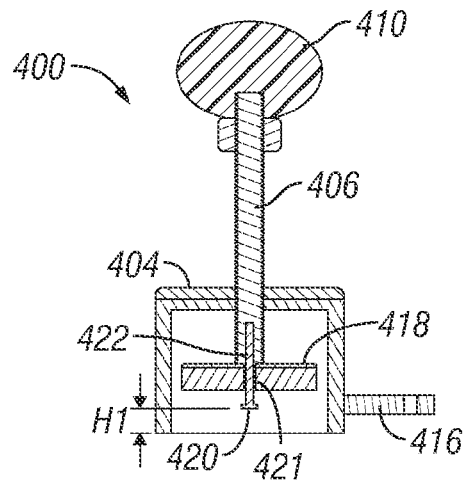
FIG. 12C shows the clamp assembly of FIGS. 12A and 12B in an alternate position.

Referring now to FIGS. 12C and 13, to at least weaken the magnetic coupling between the magnetic member 418 and the table top 18, the knob member 410 may be turned to move or retract at least a portion of the first shaft portion 406 to at least a second position out of the outer casing 402 from the top side 404 to urge the magnetic member 18 away from the table top surface 18 (shown in FIG. 1). In FIG. 12C, the first shaft portion 406 and the second shaft portion 422 have been raised a distance H1 from the first position to the second position. In some embodiments, the magnetic member 418, in the second position shown in FIG. 12C, may be magnetically attracted to inner portions of the shell of the outer casing 402 and may be drawn generally towards the first stop 423, which in some embodiments is the first shaft portion 422.

Motor Assembly 500

Figure 14:
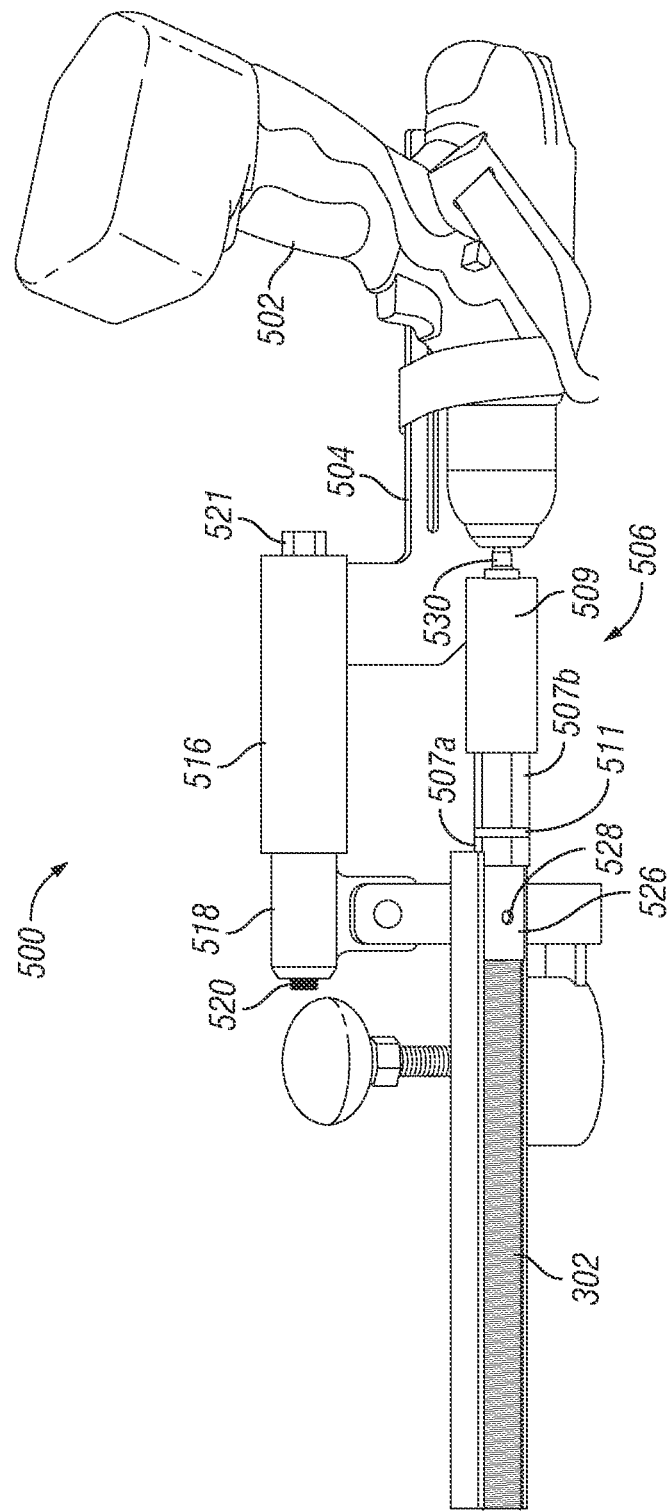
FIG. 14 shows a perspective view of a motor assembly.

Turning now to FIGS. 14 and 15, there is shown a perspective view of the motor assembly 500, in FIG. 14, and a perspective view of a motor support bracket 504, in FIG. 15. The motor assembly 500 may comprise a motor 502 coupled to a motor support bracket 504. The motor support bracket 504 may be mounted at one end of the threaded rod 302. In some embodiments, the motor 502 may comprise a drill, but it will be understood by persons of ordinary skill in the art that other motors or actuation devices may be substituted.

The motor 502 may be coupled along a length of the motor support bracket 504. The motor support bracket 504 may comprise a first portion 508. The first portion 508 may comprise a generally flat member, extending along a length and having one or more slits 510 extending along the length of the first portion of the motor support bracket 504. In some embodiments, straps 512 may be strung through the slits 510. The straps 512 may be tied or fastened around the motor 502 to fix the motor 502 relative to the motor support bracket 504. In some embodiments, the straps 512 may comprise Velcro fasteners, but it should be understood that other fasteners or ties may be used in place of the straps 512 to fix the motor 502 to the motor support bracket 504.

A second portion 514 of the motor support bracket 504 may comprise a first adjustment member 516 extending from a first end of the first portion 508. In some embodiments, the first adjustment member 516 may comprise a generally hollow cylindrical shape having a bore for receiving a bolt 520 at a first end and an opening for receiving a second adjustment member 518 at a second end.

The second adjustment member 518 may extend into the opening at the second end of the first adjustment member 516 so that the second adjustment member 518 may slide in and out of the opening. The second adjustment member 518 may comprise a generally solid cylindrical shape having a threaded bore extending longitudinally through the second adjustment member 518.

A first adjustment bolt 520 may extend from a bolt head 521 through hollow portions of the first adjustment member 516 and threadably engage the second adjustment member 518. The first adjustment bolt 520 may be threadably advanced within the second adjustment member 518 to adjust the position of the first adjustment member 516 relative to the second adjustment member 518. Adjustment of the first adjustment member 516 relative to the second adjustment member 518 allows for the distance between the driving mechanism 530 of the motor 502 to be increased or decreased from an adapter assembly 506 to accommodate different drill body sizes to be aligned with the threaded rod 302.

The second adjustment member 518 may also be adjustably coupled to the stand 306. A tab portion 522 may extend from a side portion of the second adjustment member 518. The tab portion 522 may make contact with the stand 306. A second adjustment bolt 524 may extend through bores in the tab portion 522 and the stand 306. In some embodiments, a shaft portion of the bolt 524 may act as a pivot for the motor support bracket 504 to adjust the angular orientation between the stand 306 and the motor support bracket 504. A nut may be attached to the second adjustment bolt 524 to secure the tab portion 522 and the stand 306 together, and to fix the motor support bracket 504 relative to the stand 306.

The motor assembly 500 may further comprise an adapter assembly 506 for rotatably coupling a driving mechanism of the motor 502 to the rail assembly. As shown in FIG. 14, the adapter assembly 506 may include one or more adapter nuts 507a and 507b connected in series to the threaded rod 302. As shown in FIG. 14, the nut 507 is threadably coupled to the threaded rod 302. The nut 507 is configured to receive a drive socket 509, which may form part of the drive mechanism 530 of the motor 502. A washer 511 may be positioned over the threaded rod 302 between the first nut 507a and the second nut 507b so that rotation of the first nut 507a by the drive mechanism 530 results in rotation of the threaded rod 302.

In the embodiment shown in FIG. 14, an end portion of the threaded rod 302 passes through a rod support 526. The rod support 526 generally comprises a hollow cylindrical member attached to the stand 306 and positioned to receive the end portion of the threaded rod 302 in a channel running through the rod support 526. In some embodiments, the nuts 507a and 507b are threaded over the threaded rod 302 so that the second nut 507b abuts one end of the rod support 526. A grease hole 528 may pass through the outer surface of the rod support 526 for providing lubricant to the threaded rod 302.

Laser Guide Assembly 600

As shown in FIG. 1, the cutting device 100 may also include a laser guide assembly 600 for providing a straight line across the cutting material 14 to show the user where the cut will be prior to cutting. The laser guide assembly 600 may comprise a laser light 602 mounted on a laser light support bracket 604.

The laser guide assembly 600 may be mounted on the opposite end of the threaded rod 302 from the motor assembly 500. A coupling plate 601 of the laser light support bracket 604 may couple with bolts to the stand 306 and the clamp assembly 400.

Turning now to FIG. 13, the laser light 602 may be mounted on a bracket platform 607 of the bracket 604 for aligning the direction 605 of the beam of light with a desired cutting path 15. The laser light 602 may be adjusted relative the bracket 604 by adjusting the length of adjustment screws 608 that pass through side walls 610 in the bracket 604 and make contact with side portions of the laser light 602.

The laser light support bracket 604 may include a rod member 610 fixed to a bottom portion of the platform 607. The rod member 610 may extend from the platform 607 to pivotally couple to the coupling plate 601 having a coupling plate sleeve 612 for receiving at least a longitudinal length of the rod member 610. The rod member 610 may be free to rotate within the sleeve 612 to pivot the platform 607 relative to the coupling plate 601, the stand 306, and the clamp assembly 400.

A coupling plate bolt 614 may pass through the coupling plate sleeve 612 to engage a surface of the rod member 610. When the coupling plate bolt 614 is tightened, the rod member 610, and thus the platform 607, may be fixed relative to the coupling plate 601, the stand 306, and the clamp assembly 400. The direction 605 of the laser light may be pivoted relative to the horizontal orientation of the cutting material 14 by pivoting the laser light 602 through use of the coupling plate bolt 614.

Method for Cutting Material

Turning back to FIG. 1, a method of cutting material using the cutting device 100 may include clamping the cutting device 100 using the clamp assemblies 400 located at each end of the threaded rod 302. The knob member 410 of each clamp assembly 400 may be rotated until the magnetic member (not shown) magnetically snaps to the table surface 18. Generally, the rail assembly 300 will be positioned so that it runs along and generally parallel the edge of the table top 18 so that the torch tip 12 will cut through the material 14 but not through the table top 18.

A torch 10 may be positioned within the torch guide assembly 200. The torch guide assembly 200 may begin in a disengaged position, where the torch guide assembly 200 is pivoted away from the cutting material 14. The user may fix the torch 10 to the torch guide assembly 200 turning the knob member 211 to adjust the clamp member 217 until the clamp member 217 presses against the outer portions of the torch 10 to hold the torch 10 in the cradle support 202.

The cutting material 14 may be placed on the table top 18. At this point, the torch 10 may be pivoted to an engaged position by rotating the cradle support 202 about the first bolt 216, where the torch tip 12 is positioned proximal to the cutting material. In the engaged position the second head portion 230 may abut or make contact with a portion of the rail assembly 300. The length l of the portion of the second threaded member 224 that extends from the extension block 220 may establish the position of the torch tip 12 relative to the cutting material 14. Adjusting the length by manually turning the second head portion 230 adjusts the desired cutting path along the cutting material 14.

In some embodiments, the laser guide assembly 600 may be used to shine a reference straight line across the cutting material 14. Adjustments, such as adjustment screws 608, may be used to fix the mounting of the laser light 608 to align the light emanating from the laser light 602 in parallel with the length of the threaded rod 302. The laser light support bracket 604 may be pivotally adjusted to bring the light up or down relative to the surface of the cutting material 14 so that the light emanating from the laser light 602 skims along the top surface of the cutting material 14. The laser light support bracket 604 may be fixed by tightening the coupling plate bolt 614 to fix the platform 607 relative to the coupling plate 601, the stand 306, and the clamp assembly 400

The orientation of the torch tip 12 may be established to fix the cutting path and also the cutting angle. The cutting path may be adjusted by turning the second head portion 230 of the second threaded member 224, which may change the orientation of the torch guide assembly 200 relative to the rail assembly 300 to adjust the position of the torch tip 12 relative to the cutting material. Also, turning the first head portion 226 of the first threaded member 222 may pitch the torch tip 12 to adjust the angle of the torch tip relative to the cutting material. Adjusting the torch tip 12 angle may create a beveled cut. If needed, the position of the torch 10 on the cradle support 202 may be adjusted using the knob member 211 to release the torch from the holding clamp 212.

A motor 502 or drill may be mounted to the rail assembly 300 to provide a motive force for moving the torch guide assembly 200 along the rail assembly 300, and the torch 10 along the cutting path. The motor 502 may be secured to the motor support bracket 504 using straps 512 to tie a body of the motor 502 to the motor support bracket 504. The straps 512 may be strung through slits 510 and wrapped around the motor. Velcro fasteners or types of ties known in the art may be used to lock the straps 512.

The drive mechanism of the motor 502 may be secured to the adapter assembly 506. A drive socket mounted on the drive mechanism may be coupled to one or more adapter nuts 507 to transfer the rotational drive force of the motor 502 to the threaded rod 302. If the drive socket sags or is misaligned with the one or more adapter nuts 507, the distance of the motor support bracket 504 from the rail assembly 300 may be increased or decreased by rotating the first adjustment bolt 516. The motor support bracket 504 may be raised or pivoted by readjusting the second adjustment member 518 using the second adjustment bolt 520.

Before the torch 10 is turned on, the motor 502 may be turned on to rotate the threaded rod 302 to place the torch tip 12 at the desired beginning of the cutting path. While the torch 10 is stationary, the actuator member 232 may be used to lock the torch 10 in the on-position. The first bent portion 233 of the actuator member 234 may be positioned beneath the torch trigger to actuate the torch trigger. The head member 234 may be turned to tighten the head member 234 against the housing 234, which may press the actuation member 232 against the outer portion of the clamp arm. The force of the housing 234 pressing the actuation member 232 may prevent the first bent portion 233 from disengaging from the torch trigger.

The user may engage the motor 502, such as pushing a trigger for a drill, to begin rotation of the threaded rod 302. The rotation of the threaded rod 302 imparts a linear force on the torch guide assembly 200 through the threading within the first bore 242 of the connector member 240 to move the torch guide assembly 200.

The movement of the torch guide assembly 200 moves the torch tip 12 along the desired cutting path. When the torch tip 12 has reached the end of the cutting path, the user may manually stop the motor 502, which stops movement of the torch 10. The user may disengage the actuator member 232 from the torch trigger.

The user may pivot the torch guide assembly 200 to a disengaged position from the engaged position by rotating the cradle support 202 about the first bolt 216 away from the rail assembly 300. The user may loosen the pivot knob 218 to allow the cradle support 202 to pivot freely. In some embodiments, the pivot knob 218 may be left in a slightly loose configuration to allow for quicker set-up and cutting procedures. Leaving the pivot knob 218 slightly loose may also allow the rubber wheel 292 and spring action of the wheel assembly 290 to operate smoothly.

In pivoting the cradle support 202 away from the rail assembly 300 the settings of the first head portion 226 and the second head portion 230 may remain undisturbed because pivoting of the cradle support 201 may not affect the settings of each of the first threaded member 222 and the second threaded member 224.

A second cutting material (not shown) may be placed on the table top 18 for cutting with the torch 10. The torch guide assembly 200 may be moved by the motor 502 to the desired starting point of the cutting path. If substantially the same adjustments to the relative orientation of the torch tip 12 to the second cutting material are desired, as used with the first cutting material 14, then the cradle support 202 may be pivoted from the disengaged position to the engaged position and no further adjustments need be made to the first threaded member 222 or the second threaded member 224, as described above. The laser light of the guide assembly 600 may be utilized to align the cutting path with the torch tip 12. The torch trigger may be re-engaged by the actuator member 232, and the motor 502 manually turned on again to begin cutting of the second cutting material.

Referring now to FIGS. 11B and 12B, the torch guide assembly 200 and the clamp assembly 400 may be constructed from metal, such as steel, aluminum, metal alloys or other suitable material known by persons of ordinary skill in the art. In addition other components, the rail assembly 300, the motor assembly 500, and the laser guide assembly 600 may be manufactured from metals, such as steel, aluminum, metal alloys or other suitable material known by persons of ordinary skill in the art. In some cases, such as for example the knobs 218, 235, and 410 shown in FIGS. 4, 11B, and 12B may be made from plastic, polymer, or other known material appropriate for providing a griping surface.

The components described herein may be coupled by various methods of fastening, such as welding, gluing, snap fits, screws, bolts, and other known connection methods. Furthermore, the components described herein may be configured as a kit so that the torch guide device is sold disassembled as a kit into one or more parts. In some embodiments, the kit may be transportable from one location to the next so that users may disassemble and reassembly the torch guide device 100.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A torch guide device comprising:
a cradle assembly coupled to a rail assembly, wherein the cradle assembly is configured for holding a torch to align a torch tip of the torch to a target material, and wherein the cradle assembly is movable along a rail of the rail assembly for cutting the target material with the torch along a cutting path;
a connector member coupling the cradle assembly to the rail assembly, wherein the connector member comprises a pivot for pivoting the cradle assembly relative to the rail assembly; and
wherein the cradle assembly comprises a first adjustable stop, and wherein the first adjustable stop is configured to pivot to contact the rail of the rail assembly when the cradle assembly is in at least a first position;
wherein the first adjustable stop comprises a first length extending from a first opening in the cradle assembly, wherein the first length comprises an adjustable first distance between a first location on the first adjustable stop where the first adjustable stop exits the first opening and a second location on the first adjustable stop where the first adjustable stop is configured to make contact with the rail of the rail assembly, when the cradle assembly is in the first position;
wherein the first distance is adjustable by movement of the first adjustable stop through the first opening to adjust the first length and to change the first location on the first adjustable stop where the first adjustable stop exits the first opening; and
wherein the adjustable first distance establishes a first orientation of the torch tip relative to the target material.

2. The torch guide device of claim 1, wherein the first adjustable stop is configured to change the first orientation.

3. The torch guide device of claim 2 further comprising:
wherein the cradle assembly is movably mounted on a threaded rod, and wherein the threaded rod extends in parallel with the rail assembly; and
wherein rotation of the threaded rod moves the cradle assembly linearly along the rail assembly.

4. The torch guide device of claim 3 further comprising:
wherein the first adjustable stop comprises a threaded member threadably coupled in the first opening of the cradle assembly at a distance offset from the pivot, wherein the first opening comprises a threaded bore configured to threadably couple to the threaded member, and wherein a head portion of the threaded member makes contact with the rail assembly in at least the first position.

5. The torch guide device of claim 4, wherein the head portion is rotatable for changing the first orientation of the cradle assembly with respect to the rail assembly.

6. The torch guide device of claim 5 further comprising an actuation member extending from the cradle assembly to actuate a trigger of the torch in an on position.

7. The torch guide device of claim 6, further comprising an adapter assembly configured for rotatably coupling a drive mechanism of a motor to the threaded rod, wherein the motor is a hand-held drill.

8. The torch guide device of claim 7, further comprising one or more clamp assemblies coupled to the rail assembly for holding the rail assembly in place relative to a table surface, wherein each clamp assembly comprises the following:
a clamp body made of a magnetically attractive material, wherein the clamp body comprises a shell defining a cavity and a bottom side of the clamp body is configured to rest on a first surface for clamping the clamp body to the first surface;
a first shaft member extending along a first longitudinal axis through the shell and into the cavity toward the bottom side;
a magnetic member mounted on the bottom side of the clamp body, the magnetic member mounted to move along at least a portion of the first shaft member in at least the direction of the first longitudinal axis;
wherein movement of the magnetic member is constrained between a first stop and a second stop, the first stop and the second stop positioned on opposite sides of the magnetic member along the first shaft member; and
wherein the first shaft member is moveable in the direction of the first longitudinal axis relative to the clamp body to retract or insert at least a portion of the first shaft member from or into the shell, and wherein movement of the first shaft member displaces the magnetic member with the first shaft member within the cavity.

9. A torch guide device comprising:
a cradle assembly coupled to a rail assembly, wherein the cradle assembly is configured for holding a torch to align a torch tip of the torch to a target material, and wherein the cradle assembly is movable along the rail assembly for cutting the target material with the torch along a cutting path;
one or more clamp assemblies coupled to the rail assembly for holding the rail assembly in place relative to a table surface, wherein each clamp assembly comprises the following:
a clamp body made of a magnetically attractive material, wherein the clamp body comprises a shell defining a cavity and a bottom side of the clamp body is configured to rest on a first surface for clamping the clamp body to the first surface;
a first shaft member extending along a first longitudinal axis through the shell and into the cavity toward the bottom side;
a magnetic member mounted on the bottom side of the clamp body, the magnetic member mounted to move along at least a portion of the first shaft member in at least the direction of the first longitudinal axis;

wherein movement of the magnetic member is constrained between a first stop and a second stop, the first stop and the second stop positioned on opposite sides of the magnetic member along the first shaft member; and wherein the first shaft member is moveable in the direction of the first longitudinal axis relative to the clamp body to retract or insert at least a portion of the first shaft member from or into the shell, and wherein movement of the first shaft member displaces the magnetic member with the first shaft member within the cavity.

\* \* \* \* \*